(12) United States Patent
Li et al.

(10) Patent No.: US 9,732,231 B2
(45) Date of Patent: Aug. 15, 2017

(54) METHOD OF MAKING ELECTROPHORETIC DISPERSION

(71) Applicant: E Ink California, LLC, Fremont, CA (US)

(72) Inventors: Yu Li, Fremont, CA (US); Hui Du, Milpitas, CA (US); Yayong Liu, Fremont, CA (US); Haiyan Gu, Fremont, CA (US); HongMei Zang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 15/224,964

(22) Filed: Aug. 1, 2016

(65) Prior Publication Data

US 2016/0333185 A1 Nov. 17, 2016

Related U.S. Application Data

(62) Division of application No. 13/287,704, filed on Nov. 2, 2011, now Pat. No. 9,428,649.

(60) Provisional application No. 61/410,810, filed on Nov. 5, 2010.

(51) Int. Cl.

| | |
|---|---|
| *H01B 1/00* | (2006.01) |
| *H01B 1/12* | (2006.01) |
| *C09C 1/36* | (2006.01) |
| *C09C 1/56* | (2006.01) |
| *C08F 292/00* | (2006.01) |

(Continued)

(52) U.S. Cl.
CPC .......... *C09C 1/3676* (2013.01); *C08F 292/00* (2013.01); *C09C 1/3669* (2013.01); *C09C 1/3692* (2013.01); *C09C 1/56* (2013.01); *G02F 1/167* (2013.01); *C08F 2438/03* (2013.01); *G02F 2001/1678* (2013.01)

(58) Field of Classification Search
USPC .......... 204/600; 252/500; 345/107; 359/290, 359/296; 399/131; 430/32; 524/556; 526/172
See application file for complete search history.

(56) References Cited

U.S. PATENT DOCUMENTS

| | | | |
|---|---|---|---|
| 3,874,896 A * | 4/1975 | Machida | ................ G03G 9/131 430/100 |
| 6,859,302 B2 | 2/2005 | Liang | |
| 6,894,116 B2 | 5/2005 | Lai | |

(Continued)

OTHER PUBLICATIONS

Martina H. Stenzel, Hairy Core—Shell Nanoparticles via RAFT: Where are the Opportunities and Where are the Problems and Challenges?Macromol. Rapid Commun. 2009, 30, 1603-1624, 2009 WILEY-VCH Verlag GmbH & Co. KGaA, Weinheim.*

(Continued)

*Primary Examiner* — Bijan Ahvazi
(74) *Attorney, Agent, or Firm* — Brian D. Bean

(57) ABSTRACT

The present invention is directed to methods of making an electrophoretic dispersion comprising pigment particles dispersed in a solvent or solvent mixture, wherein said pigment particles comprises at least one polymer chain comprising a terminal thiocarbonylthio group, attached to the particle surface. The invention also relates to pigment particles suitable for use in an electrophoretic dispersion and methods for their preparation through a RAFT polymerization technique.

8 Claims, 6 Drawing Sheets

(51) Int. Cl.
G03G 17/04 (2006.01)
G02F 1/167 (2006.01)

(56) References Cited

U.S. PATENT DOCUMENTS

| | | | |
|---|---|---|---|
| 6,930,818 B1 | 8/2005 | Liang | |
| 7,052,766 B2 | 5/2006 | Zang | |
| 7,110,162 B2 | 9/2006 | Wu | |
| 7,286,279 B2 | 10/2007 | Yu | |
| 2005/0270628 A1* | 12/2005 | Miyazaki | B01J 13/14 359/296 |
| 2006/0199900 A1* | 9/2006 | Matsumoto | B82Y 30/00 524/556 |
| 2006/0223936 A1* | 10/2006 | Such | C07C 329/00 524/555 |

OTHER PUBLICATIONS

Nikkei Microdevices (Dec. 2002) Newly -Developed Color Electronic Paper Promises—Unbeatable Production Efficiency. Nikkei Microdevices; p. 3(in Japanese, with English translation) Dec. 1, 2002.
Liang, R.C., Hou, J., & Zang, H.M. (Dec. 2002) Microcup Electrophoretic Dispays by Roll-to-Roll Manufacturing Processes. IDW. EP2-2, 1337-1340, Dec. 4, 2002.
Liang, R.C. (Feb. 2003) Microcup Electrophoretic and Liquid Crystal Displays by Roll-to-Roll Manufacturing Processes. Presentation conducted at the Flexibie Microelectronics & Displays Conference of U.S. Display Consortium, Phoenix, Arizona, USA. Feb. 3, 2003.
Liang, R.C., & Tseng, S. (Feb. 2003). Microcup LCD, A New Type of Dispersed LCD by a Roll-to-Roll Manufacturing Process. Paper presented at the IDMO, Taipei, Taiwan. Feb. 18, 2003.
Liang, R.C., Hou, J., Zang, H.M., & Chung, J. (Feb. 2003). Passive Matrix Microcup Electrophoretic Displays. Paper presented at the IDMC, Taipei, Taiwan, Feb. 18, 2003.
Liang, R.C., Hou, J., Zang, H.M., Chung, J., & Tseng, S. (Feb. 2003). Microcup Displays: Electronic Paper by Roll-to-Roll Manufacturing Processes. Journal of the SID, 11(4), 621-628. Feb. 18, 2003.
Chen, S.M. (May 2003) The New Application and the Dynamics of Companies. TRI. 1-10. (In Chinese, English abstract attached) May 1, 2003.
Liang, R.C., Hou, J., Chung, J., Wang, X., Pereira, C., & Chen, Y. (May 2003). Microcup Active and Passive Matrix Electrophoretic Displays by a Roll-to-Roll Manufacturing Processes. SID 03 Digest, Paper 20.1. May 21, 2003.
Lee, H., & Liang, R.C. (Jun. 2003) SiPix Microcup Electronic Paper—An Introduction. Advanced Display, Issue 37, 4-9 (in Chinese, English abstract attached) Jun. 1, 2003.
Chen, S.M. (Jul. 2003) The Applications for the Revolutionary Electronic Paper Technology. OPTO News & Letters, 102, 37-41. (in Chinese, English abstract attached) Jul. 1, 2003.
Zang, H.M., & Liang, R.C. (2003) Microcup. Electronic Paper by Roll-to-Roll Manufacturing Processes. The Spectrum, 16(2), 16-21. Jul. 1, 2003.
Allen, K. (Oct. 2003). Electrophoretics Fulfilled. Emerging Displays Review: Emerging Display Technologies, Monthly Report—Oct. 2003, 9-14, Oct. 1, 2003.
Zang, H.M. (Oct. 2003). Microcup Electronic Paper by Roll-to-Roll Manufacturing Processes. Presentation conducted at the Advisory Board Meeting, Bowling Green State University, Ohio, USA. Oct. 23, 2003.
Chung, J., Hou, J., Wang, W., Chu, L.Y., Yao, W., & Liang, R.C. (Dec. 2003). Microcup Electrophoretic Displays, Grayscale and Color Rendition. IDW, AMD2/EP1-2, 243-246. Dec. 1, 2003.
Ho, C., & Liang, R.C. (Dec. 2003). Microcup Electronic Paper by Roll-to-Roll Manufacturing Processes. Presentation conducted at FEG, Nei-Li, Taiwan. Dec. 23, 2003.

Zang, H.M., Hwang, J.J., Gu, H., Hou, J., Wang, X., Chen, Y., et al. (Jan. 2004). Threshold and Grayscale Stability of Microcup Electronic Paper. Proceeding of SPIE-IS&T Electronic Imaging, SPIE vol. 5289, 102-108. Jan. 19, 2004.
Zang, H.M. (Feb. 2004). Microcup Electronic Paper, Presentation conducted at the Displays & Microelectronics Conference of U.S. Display Consortium, Phoenix, Arizona, USA. Feb. 10, 2004.
Wang, X. Kiluk, S., Chang, C., & Liang, R.C. (Feb. 2004). Microcup Electronic Paper and the Converting Processes. ASID, 10.1.2-26, 396-399, Nanjing, China, Feb. 15, 2004.
Chaug, Y.S., Haubrich, J.E. Serecta, M. and Liang, R.C. (Apr. 2004). Roll-to-Roll Processes for the Manufacturing of Patterned Conductive Electrodes on Flexible Substrates. Mat. Res. Soc. Symp. Proc., vol. 814,I9.6.1. Apr. 12, 2004.
Liang, R.C. (Apr. 2004). Microcup Electronic Paper by Roll-to-Roll Manufacturing Process. Presentation at the Flexible Displays & Electronics 2004 of Intertech, San Fransisco, California, USA. Apr. 28, 2004.
Hou, J., Chen, Y., Li, Y., Weng, X., Li, H. and Pereira, C. (May 2004). Reliability and Performance of Flexible Electrophoretic Displays by Roll-to-Roll Manufacturing Processes, SID Digest, 32.3, 1066-1069. May 27, 2004.
Wang, X., Kiluk, S., Chang, C., & Liang, R.C., (Jun. 2004) Microcup Electronic Paper and the Converting Processes. Advanced Display, Issue 43, 48-51 on Chinese, with English abstract) Jun. 1, 2004.
Liang, R.C., Zang, H.M., Wang, X., Chung, J. & Lee, H., (Jun./Jul. 2004) Format Flexible Microcup Electronic Paper by Roll-to-Roll Manufacturing Process, Presentation conducted at the 14th FPD Manufacturing Technology EXPO & Conference. Jul. 2, 2004.
Liang, R.C. (Oct. 2004) Flexible and Rollable Displays /Electronic Paper—A Technology Overview. Paper presented at the METS 2004 Conference in Taipei, Taiwan. Oct. 22, 2004.
Bardsley, J.N. & Pinnel, M.R. (Nov. 2004) Microcup Electrophoretic Displays. USDC Flexible Display Report, 3.1.2. pp. 3-12-3-16. Nov. 1, 2004.
Ho, Candice. (Feb. 1, 2005) Microcup Electronic Paper Device and Application. Presentation conducted at USDC 4th Annual Flexible Display Conference 2005 Feb. 1, 2005.
Zang, H.M. & Hou, Jack, (Feb. 2005) Flexible Microcup EPC by RTR Process. Presentation conducted at Annual Paper-Like Displays Conference, Feb. 9-11, 2005, St. Pete Beach, Florida. Feb. 10, 2005.
Liang, R.C., (Feb. 2005) Flexible and Rollable Displays/Electronic Paper—A Brief Technology Overview. Flexible Display Forum, 2005, Taiwan. Feb. 17, 2005
Wang, X. et al. (Feb. 2006) Inkjet Fabrication of Multi-Color Microcup Electrophorectic Display. The 5th Flexible Microelectronics & Displays Conference of U.S. Display Consortium ( Feb. 2006), Phoenix, Arizona Feb. 9, 2006.
Zang, H.M., Wang, W., Sun, C., Gu, H., and Chen, Y. (May 2006) Monochrome and Area Color Microcup EPDs by Roll-to-Roll Manufacturing Processes. ICIS' 06 International Congress of Imaging Science Final Program and Proceedings, pp. 362-365. May 9, 2006.
Wang, X., Zang, H.M. and Li, P. (Jun. 2006) Roll-to-Roll Manufacturing Process for Full Color Electrophoretic film. SID 06 Digest, pp. 1587-1589. Jun. 8, 2006.
Zang, H.M. (Sep. 2006) Monochrome and Area Color Microcup EPDs by Roll-to-Roll Manufacturing Process. Presentation conducted at the Fourth Organic Electronics Conference and Exhibition (OEC-06), Sep. 25-27, 2006, Frankfurt, Germany. Sep. 26, 2006.
Ho, Andrew. (Nov. 2006) Embedding e-Paper in Smart Cards, Pricing Labels & Indicators, Presentation conducted at Smart Paper Conference Nov. 15-16, 2006, Atlanta, GA, USA. Nov. 15, 2006.
Zang, H.M. (Feb. 2007) Developments in Microcup Flexible Displays. Presentation conducted at the 6th Annual Flexible Display and Microelectronics Conference, Phoenix, AZ Feb. 6-8. Feb. 7, 2007.
Zang, H.M., Wang, F., Kang, Y.M., Chen, Y. and Lin, W. (Jul. 2007) Microcup e-Paper for Embedded and Flexible Designs. IDMC'07, Taipei International Convention Center, Taiwan. Jul. 6, 2007.

(56) References Cited

OTHER PUBLICATIONS

Sprague, R.A. (Sep. 23, 2009) SiPix Microcup Electrophoretic Epaper for Ebooks. NIP 25, 2009 pp. 460-462 (Presentation conducted on Sep. 23, 2009 at the 25th Int'l Conference on Digital Printing Technologies,Louisville, Kentucky USA.) Sep. 23, 2009.
Martina H. Stenzel, Hairy Core-Shell Nanoparticles via RAFT: Where are the opportunities ans Where are the Problems and Challenges? Macromol. Rapid Commun. 2009, 30, 1603-1624, 2009 WILEY-VCH Verlag GmbH & Co. KGaA, Weinheim. Jan. 1, 2009.
Mitsukami et al, 2001, Water Soluble Polymers. 81. Direct Synthesis of Hydrophilic Styrenic-Based Homopolymers and Block Copolymers in Aqueous Solution via RAFT, Macromolecules, 2001 vol. 34, No. 7, pp. 2248-2256. Jan. 1, 2001.

* cited by examiner

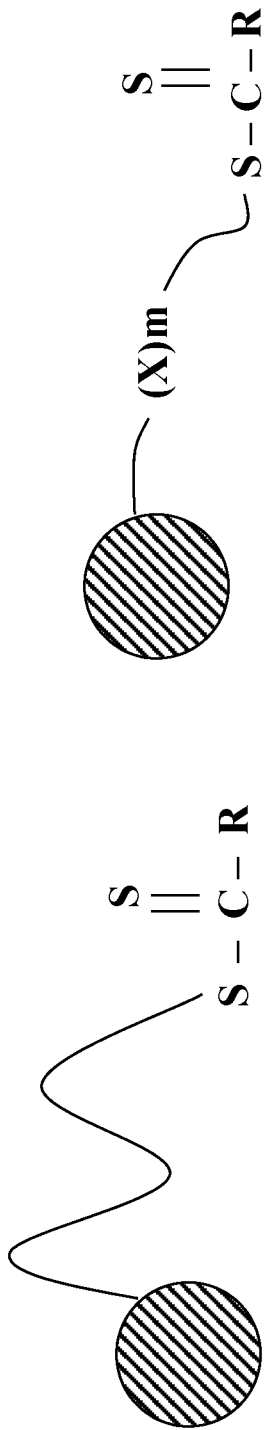
Figure 1a
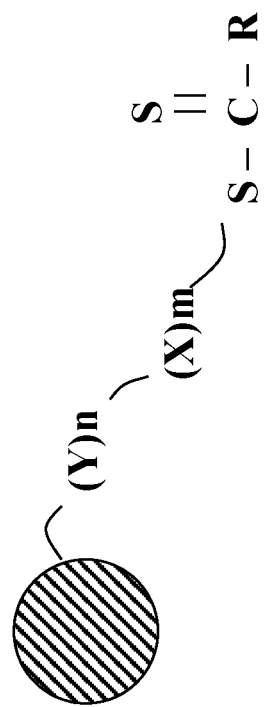
Figure 1b
Figure 1c

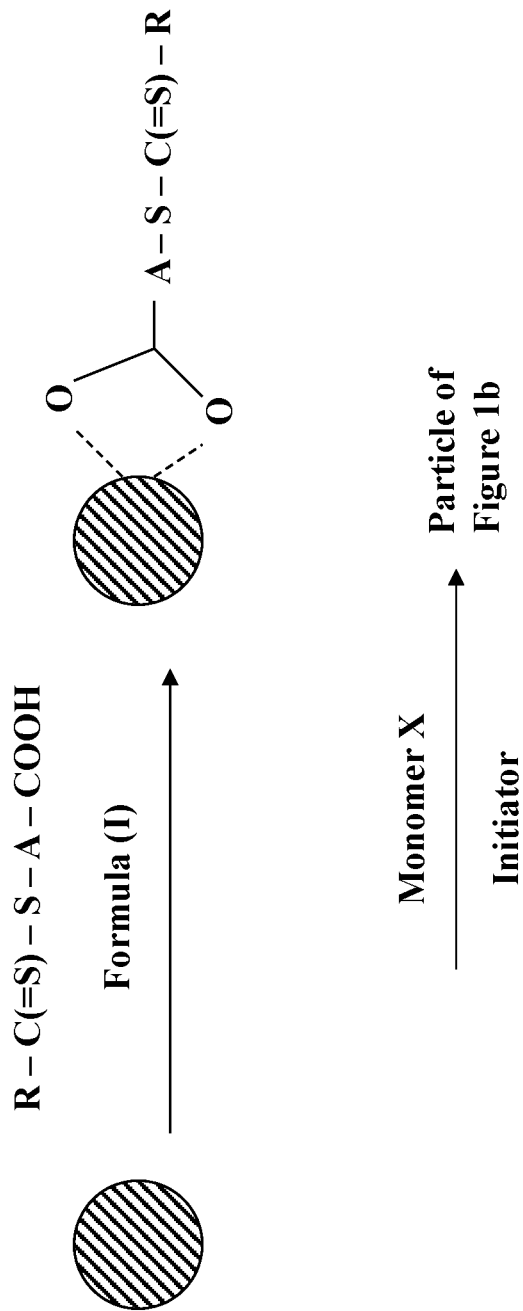

METHOD OF MAKING ELECTROPHORETIC DISPERSION

RELATED APPLICATIONS

This application is a divisional of U.S. patent application Ser. No. 13/287,704, filed Nov. 2, 2011 (published as US 2012/0112131), which claims priority to U. S. Provisional Application No. 61/410,810, filed Nov. 5, 2010; the contents of both of these application are incorporated herein by reference in their entireties.

FIELD OF THE INVENTION

The present invention is directed to an electrophoretic dispersion. More specifically, the invention relates to pigment particles suitable for use in an electrophoretic dispersion and methods for their preparation through a Reversible Addition-Fragmentation chain Transfer (RAFT) polymerization technique.

BACKGROUND

An electrophoretic display (EPD) is a non-emissive device based on the electrophoresis phenomenon influencing charged pigment particles dispersed in a dielectric solvent. An EPD typically comprises a pair of spaced-apart plate-like electrodes. At least one of the electrode plates, typically on the viewing side, is transparent. An electrophoretic dispersion composed of a dielectric solvent with charged pigment particles dispersed therein is enclosed between the two electrode plates.

An electrophoretic dispersion may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate may be either the color of the solvent or the color of the pigment particles. Reversal of plate polarity will cause the particles to migrate back to the opposite plate, thereby reversing the color.

Alternatively, an electrophoretic dispersion may have two types of pigment particles of contrasting colors and carrying opposite charges, and the two types of pigment particles are dispersed in a clear solvent or solvent mixture. In this case, when a voltage difference is imposed between the two electrode plates, the two types of pigment particles would move to the opposite ends (top or bottom) in a display cell. Thus one of the colors of the two types of the pigment particles would be seen at the viewing side of the display cell.

For all types of the electrophoretic displays, the dispersion contained within the individual display cells of the display is undoubtedly one of the most crucial parts of the device. The composition of the dispersion determines, to a large extent, the lifetime, contrast ratio, switching rate and bistability of the device.

In an ideal dispersion, the charged pigment particles in an electrophoretic dispersion must be dispersible and stable in a liquid medium. They also must have proper particle size, charge polarity and density. Therefore, for inorganic pigment particles to meet these requirements, an organic coating over the inorganic pigment particles is often needed.

Currently, an organic coating is typically applied by conventional free radical polymerization technique. However, it is difficult to achieve the desired results by such technique. For example, block copolymers, which are useful for surface polarity adjustment and charge generation, can not be made through conventional free radical polymerization. Also, there is limitation on the amount of polymer that can grow on the pigment particle surface through conventional surface free radical polymerization. The amount of polymer that can grow on the pigment particle surface is critical for the pigment particle stability and density match.

SUMMARY OF THE INVENTION

One embodiment of the present invention is directed to an electrophoretic dispersion, comprising pigment particles dispersed in a solvent or solvent mixture, wherein said pigment particles comprises at least one polymer chain comprising a terminal thiocarbonylthio group, attached to the particle surface.

Another embodiment of the present invention is directed to a method for the preparation of pigment particles, which method comprises
(a) reacting pigment particles with a RAFT reagent bearing an anchoring group; and
(b) performing RAFT polymerization of a monomer in the presence of a free radical initiator to form polymer-coated pigment particles.

A further embodiment of the present invention is directed to a method for the preparation of pigment particles, which method comprises
(a) modifying the surface of pigment particles with a reagent comprising both a free radical initiator moiety and an anchoring group; and
(b) performing RAFT polymerization of a monomer in the presence of the initiator-treated pigment particles and a RAFT reagent to form polymer-coated pigment particles.

Yet a further embodiment of the present invention is directed to a method for the preparation of pigment particles, which method comprises
(a) modifying the surface of pigment particles to introduce a vinyl functional group; and
(b) performing RAFT polymerization of a monomer on the surface modified particles, in the presence of a RAFT reagent to form polymer-coated pigment particles.

A further embodiment of the present invention is directed to a pigment particle comprising at least one polymer chain comprising a terminal thiocarbonylthio group, attached to the particle surface.

According to the present invention, the surface of the pigment particles may be efficiently modified. As a result, an electrophoretic dispersion comprising such pigment particles would have improved optical performance.

BRIEF DESCRIPTION OF THE DRAWINGS

FIGS. 1a, 1b, and 1c depict the pigment particles of the present invention.

FIG. 3 shows a reaction scheme of the invention.

DETAILED DESCRIPTION

Figure 2A:
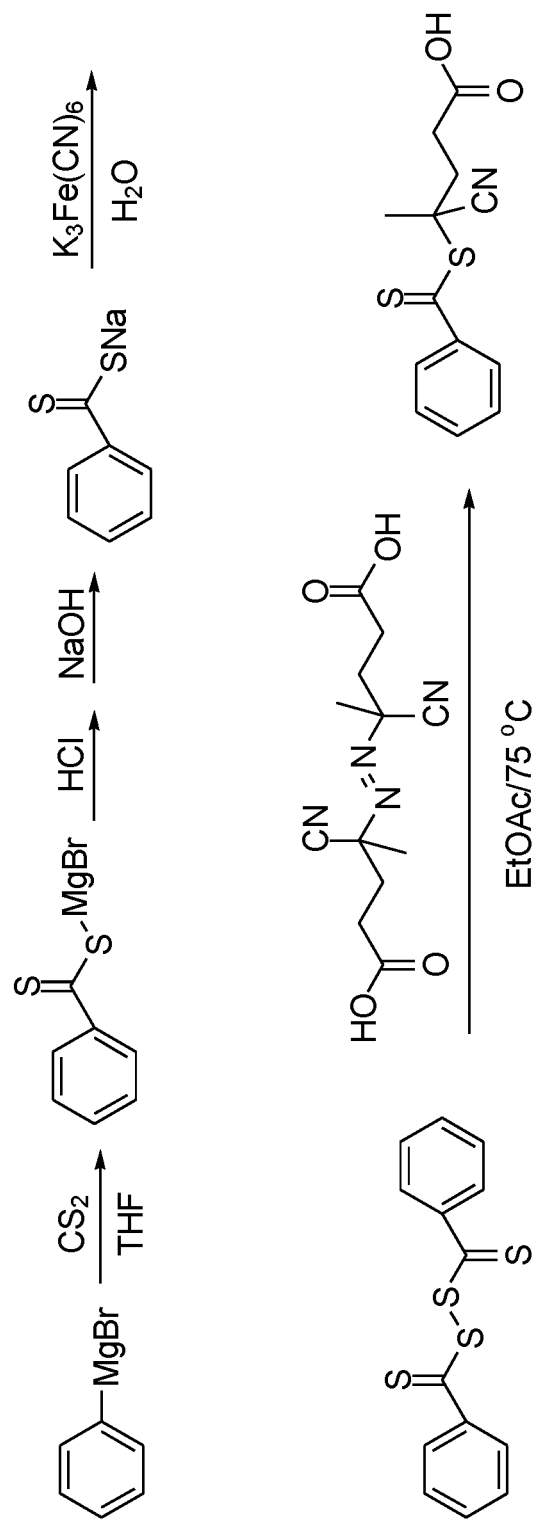
FIGS. 2a and 2b show two examples of the RAFT reagent comprising an anchoring group, used in one of the methods of the present invention and how they are prepared.

The first aspect of the present invention is directed to pigment particles suitable for use in an electrophoretic dispersion. The surface of the pigment particles comprises at least one polymer chain comprising a terminal thiocarbonylthio group, —S—C(=S)—R. FIG. 1a depicts such a pigment particle.

It is noted that in FIG. 1 and other drawings, for brevity, the pigment particle is shown to have only one polymer chain attached to its surface. However, in practice, the surface of the pigment particle usually have more than one polymer chain attached to it, the multiple chains thus forming a polymeric layer.

The R represents an organic group defined in its broadest sense. Examples of R may be selected from a group consisting of optionally substituted alkyl, optionally substituted aryl, optionally substituted alkylaryl, optionally substituted arylalkyl and polymer chains formed from any polymerization mechanisms.

The R may also comprise one or more heteroatoms, such as oxygen, nitrogen, sulfur or the like.

The preferred R groups may include, but are not limited to, optionally substituted $C_1$-$C_{20}$ linear or branched alkyl and optionally substituted $C_6$-$C_{18}$ aryl.

In one embodiment, the polymer chain attached to the surface of the pigment particle may be formed from a monomer X, as shown in FIG. 1b. In this case, the pigment particle has one layer of polymer coating.

For the purpose of this application, the monomer X preferably has longer alkyl side chains or branched side chains, and it may be lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, n-octadecyl methacrylate or the like.

The purpose of the layer formed from such a monomer X is to facilitate the dispersion of the pigment particles in a suspending solvent and hence the polymer layer formed is solvent compatible. The preferred polymer content is about 1 to about 25 wt % of the pigment particle to which the polymer chemically bonds.

The solvent in which the pigment particles are dispersed, in this case, may be a hydrocarbon solvent, such as hexane, heptane, benzene, toluene, isopar or the like.

FIG. 1c depicts another embodiment in which the pigment particle has two layers of polymer coating.

In this case, the layer formed from monomer X (as described above) is referred to as an outer layer while the layer formed from the monomer Y is referred to as the inner layer.

The polymer layer formed from the monomer Y is less compatible with the suspending solvent; but instead may contain specific functional groups such as amine, hydroxy, carboxylate, sulfonate, phosphonate, phosphate or the like, which can enhance the polarity or charging property of the pigment particle. Suitable monomers Y may include, but are not limited to, styrene, methyl acrylate, t-butyl acrylate, vinyl pyridine, 2-hydoxyethyl acrylate, dimethylaminoethyl methacrylate, vinylbenzylaminoethylaminopropyl-trimethoxysilane, methacryloxypropyltrimethoxysilane, acrylic acid, vinyl phosphoric acid or the like. The preferred polymer content from both layers, in this case is also about 1 to about 25 wt %, based on the pigment particle to which the polymer chemically bond.

In order to protect particles from agglomeration and settling in the display dispersion, the presence of the outer layer is essential, especially if the inner layer contains functional groups such as acid or amine for charging purpose.

In some cases, in order to avoid severe agglomeration and overly high charge density introduced by the functional groups, a random copolymer layer of a functional monomer Y as described above with a monomer X also as described above, may be formed as the inner layer. For example, lauryl acrylate may react with a monomer such as styrene, methyl acrylate, t-butyl acrylate, hydroxyethyl acrylate or hydroxypropyl acrylate to form a copolymer as the inner layer. In this case, the preferred molar ratio of monomer X to monomer Y is between 10:1 to 1:1.

For the two layer structure, by adjusting the thickness of the inner and outer layers, it is possible to control the polarity of the particle and the interaction between the particles, which would have a significant impact on particle size, agglomeration status and charge intensity of the pigment particles in an electrophoretic dispersion.

The two layer structure allows for an electrophoretic dispersion to have tunable performance, including reflectance, speed and bistability.

The two layer structure of pigment particles as shown in FIG. 1c also have been found to be especially effective in improving the contrast ratio of an electrophoretic display.

The pigment particles of the present invention may be prepared in a variety of ways.

In one embodiment, the surface of the particles may be first treated with a RAFT (Reversible Addition-Fragmentation Chain Transfer) reagent comprising an anchoring group.

More specifically, the method comprises the following steps:

(a) reacting pigment particles with a RAFT reagent bearing an anchoring group; and (b) performing RAFT polymerization of a monomer in the presence of a free radical initiator to form polymer-coated pigment particles.

In Step (a), the RAFT reagent bears both a thiocarbonyl thio group and an anchoring group which is able to covalently or ionically bond to the pigment surface. Such a reagent may be represented by the following formula:

R—C(=S)—S-A-B        (I)

wherein R is defined as above, A is a linking moiety and B is an anchoring group. The linking moiety, A, may be any moiety which can chemically link the thiocarbonyl thio group to the anchoring group. For example, A may be an optionally substituted alkylene or arylene, which may or may not comprise heteroatom(s). The anchoring group, B, for example, may be a carboxylic acid group, a primary or secondary amino group, a hydroxyl group, a mecapto group, a silane group or the like.

For brevity, a compound of Formula (I) may be referred to as a RAFT reagent comprising an anchoring group.

The RAFT reagents of Formula (I) may be prepared by methods known in the art (see U.S. Pat. No. 6,894,116 or "Water-Soluble Polymers. 81. Direct Synthesis of Hydrophilic Styrenic-Based Homopolymers and Block Copolymers in Aqueous Solution via RAFT" by Mitsukami et al, Macromolecules 2001, 34, pages 2248-2256)

Figure 2B:
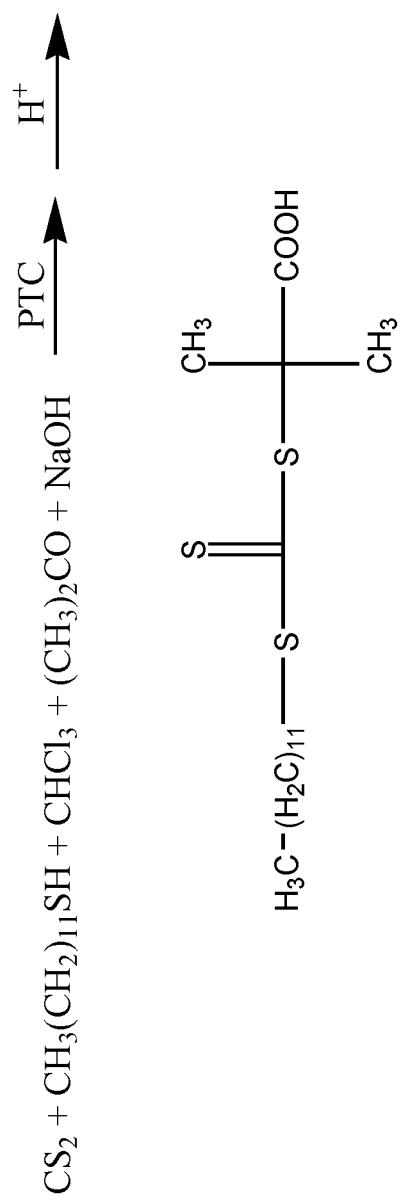

FIGS. 2a and 2b show examples of the RAFT reagent comprising an anchoring group and how they are prepared. In the RAFT reagent of FIG. 2a, R is phenyl, A is —C(CH$_3$)(CN)—(CH—$_2$)$_2$— and the anchoring group B is a carboxyl group. In the RAFT reagent of FIG. 2b, R is CH$_3$—(CH$_2$)$_{11}$—S—, A is —C(CH$_3$)$_2$— and the anchoring group B is also a carboxyl group. Detailed reaction conditions can be found in the references cited above.

In Step (a) of the method, a RAFT reagent comprising an anchoring group is first reacted with pigment particles. The reaction may be carried out in a solvent such as tetrahydofuran (THF), isopropanol or the like, at a temperature between about 0 and about 80° C.

In Step (b), a monomer as one of those described above as monomer X is introduced into a reaction vessel along with the pigment particles formed in Step (a). The reaction may be carried out in a solvent such as toluene, THF, benzene or the like, at a temperature between about 50 and about 100° C., under nitrogen. In this reaction, a free radical initiator such as azobisisobutyronitrile (AIBN) is preferably added. This method forms the pigment particles having one layer of polymer coating and the reaction scheme is shown in FIG. 3 in which the anchoring group is a carboxyl group.

If both layers of polymer coating are desired, step (b) may be carried out first with monomer Y, followed by step (b) again with monomer X. In other words, the inner layer is formed first, before the formation of the outer layer.

If an inner layer of a copolymer of X and Y is desired, a mixture of the monomer X and monomer Y in a molar ratio of between 10:1 and 1:1 is introduced first to form the inner layer.

In another embodiment, the surface of the pigment particles may be first modified with a free radical initiator.

The method comprises the following steps:

(a) modifying the surface of pigment particles with a reagent comprising both a free radical initiator moiety and an anchoring group; and (b) performing RAFT polymerization of a monomer in the presence of the initiator-treated pigment particles and a RAFT reagent to form polymer-coated pigment particles.

Step (a) may be carried out in a variety of ways. In general, a reactive group is first attached to the surface of the pigment particles, which is then reacted with a reagent represented by the following structure (II):

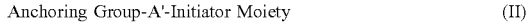

Anchoring Group-A'-Initiator Moiety  (II)

As shown, the reagent of Formula (II) comprises (i) an anchoring group which is reactive with the reactive group already on the surface of the pigment particles and (ii) a free radical initiator moiety. A's is a linking moiety which is capable of chemically linking the anchoring group to the initiator moiety.

For example, the reactive group may be an amino group and the anchoring group may be a carboxylic group. The amino reactive group may be first introduced onto the surface of the pigment particles with a reagent such as 3-aminopropyltrimethoxysilane, aminophenyl-trimethoxysilane, N-(2-aminoethyl)-3-aminopropyltrimethoxysilane or the like. The initiator-containing reagent of Formula (II), in this case, may be 4'-azobis(4-cyanovaleric acid). The coupling reaction between the amino group and the carboxylic acid anchoring group is preferably carried out in the presence of a catalyst. Example 2 below demonstrates such a reaction.

The initiator-treated pigment particles are then reacted with monomer X (as described above) in the presence of a RAFT reagent represented by the following formula (III):

Figure 4:
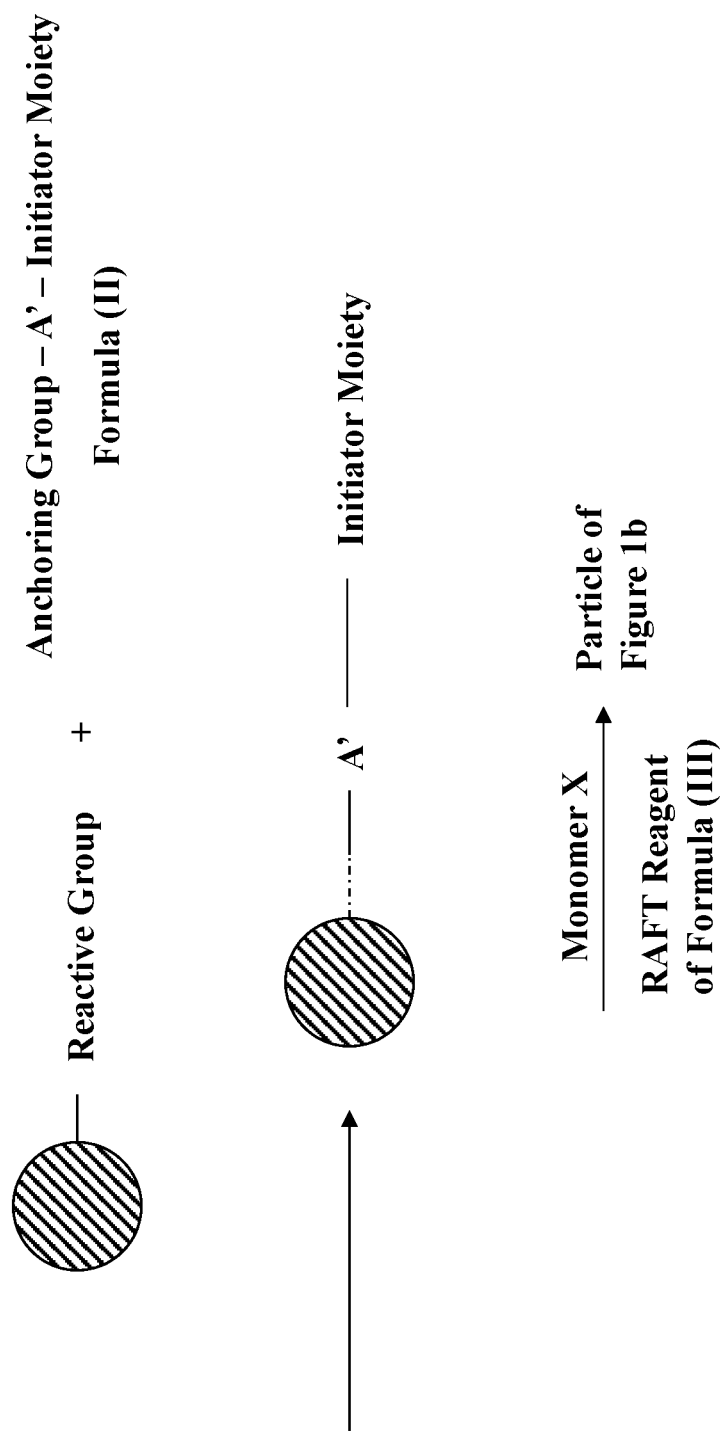
FIG. 4 shows a reaction scheme of the invention.

R—C(=S)—S—R'  (III)

to cause formation of one layer of polymer coating, as shown in FIG. 1b. The reaction may be carried out in a solvent such as THF, toluene, benzene or the like. The reaction scheme is shown in FIG. 4.

In the RAFT reagent of Formula (III), R and R' may be the same or different and they are chemical moieties defined in the broadest sense, as described above for R. For brevity, the reagent of Formula (III) is referred to as a RAFT reagent in this application. The reagents of Formula (III) may also be prepared by the methods as described in the references cited above.

If two layers of organic coating are desired, step (b) may be carried out first with monomer Y, followed by step (b) again with monomer X. In other words, the inner layer is formed first, before the formation of the outer layer.

If an inner layer of a copolymer of X and Y is desired, a mixture of the monomer X and monomer Y in a molar ratio of between 10:1 and 1:1 is introduced first to form the inner layer.

In a further embodiment, the surface of the pigment particles may be first modified with a monomer.

The method comprises the following steps:

(a) modifying the surface of pigment particles to introduce a vinyl functional group; and (b) performing RAFT polymerization of a monomer on the surface modified particles, in the presence of a RAFT reagent and free radical initiator to form polymer-coated pigment particles.

The introduction of a vinyl functional group on the surface of the pigment particles may be accomplished with a material such as vinylbenzylaminoethylaminopropyltrimethoxysilane (Z-6032) or methacryloxypropyltrimethoxysilane (Z6030). The reaction may be carried out in a solvent such as isopropanol, methylethylketone or the like.

Figure 5:
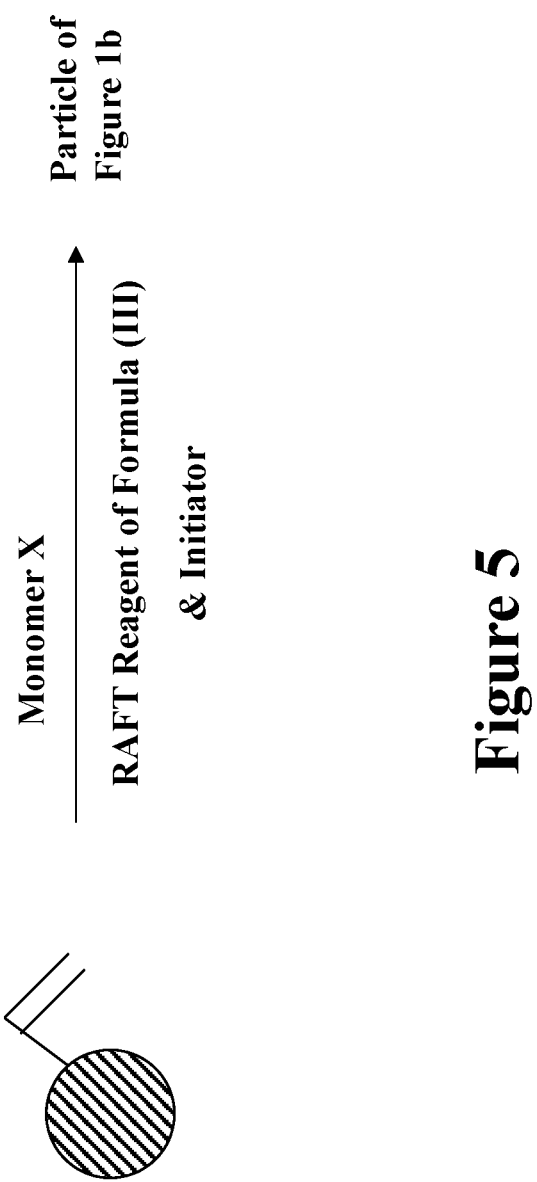
FIG. 5 shows a reaction scheme of the invention.

The pigment particles with a vinyl functional group on the surface are then reacted with a monomer X in the presence of a RAFT reagent of Formula (III) and a free radical initiator. The resulting pigment particles will have one layer of organic coating as shown in FIG. 1b. The reaction scheme is shown in FIG. 5.

If two layers of organic coating are desired, step (b) may be carried out first with monomer Y, followed by step (b) again with monomer X. In other words, the inner layer is formed first, before the formation of the outer layer.

If an inner layer of a copolymer of X and Y is desired, a mixture of the monomer X and monomer Y in a molar ratio of between 10:1 and 1:1 is introduced first to form the inner layer.

The present invention may be widely applied to any types of pigment particles. For example, it may be applied to black particles including inorganic, organic or polymeric black particles. Examples may include manganese ferrite black spinel, copper chromite black spinel, carbon black, zinc sulfide, stained black polymer particles or particles formed from other color absorbing materials.

The present invention may also be applicable to white particles, including also inorganic, organic or polymeric white particles. To achieve a high light scattering, pigments of a high refractive index are particularly useful. Suitable white pigment particles may include $TiO_2$, $BaSO_4$ and $ZnO$, with $TiO_2$ being the most preferred.

While black and white particles are specifically mentioned, it is understood that pigment particles of other colors may also be prepared according to the present invention.

The present invention is applicable to a one-particle or two-particle electrophoretic dispersion system.

In other words, the present invention may be directed to an electrophoretic dispersion comprising only one type of pigment particles of the present invention, and alternatively, the present invention may be directed to an electrophoretic dispersion comprising two types of pigment particles and at least one of the two types of the pigment particles is the pigment particles according to the present invention. The two types of pigment particles carry opposite charge polarities and have contrasting colors. For example, the two types of pigment particles may be black and white respectively. In this case, the black particles may be those of the present invention, or the white particles may be those of the present invention, or both black and white particles may be those of the present invention.

Other than the hydrocarbon solvents named above, other solvents such as silicone oil, halogenated solvents or the like may also used to disperse the pigment particles of the present invention.

In the two particle system, if only one type of the pigment particles is prepared according to the present invention, the other type of pigment particles may be prepared by another method. For example, the other particles may be simply pigment particles or polymer encapsulated pigment particles. The former is pigment particles which are not microencapsulated or coated. However, in order to match the density of the pigment particles to that of the solvent in which the particles are dispersed, the pigment particles are preferably microencapsulated or coated with a polymer matrix to form the polymer encapsulated pigment particles. Any known microencapsulation techniques may be used to prepare such coated particles. Examples of the microencapsulation technique may be those described in U.S. Pat. Nos. 7,110,162, 7,052,766 and 7,286,279, the contents of all of which are incorporated herein in their entirety by reference.

EXAMPLES

Example 1

Step A: Deposition of 2-Cyanoprop-2-yl Dithiobenzoate on White Pigment Particles To a 250 mL reactor, $TiO_2$ (Dupont R960, 3 g), tetrahydofuran (THF) (50 mL) and 2-cyanoprop-2-yl dithiobenzoate (CPDB) (1 g) were added. The reactor was heated to 65° C. with magnetic stirring under nitrogen. After 24 hours, the mixture was centrifuged at 6000 rpm for 10 minutes. The solids were redispersed in THF (50 g), centrifuged, and dried at room temperature under vacuum overnight to produce the desired product.

Step B: Preparation of Polymer Coated White Pigment Particles

To a 250 mL flask, particles (2 g) prepared in Step A, lauryl methacrylate (10 g) and 25 mL of toluene were added, followed by the addition of azobisisobutyronitrile (AIBN) (20 mg). The flask was purged with nitrogen for 20 minutes and then heated to 70° C. with magnetic stirring. After 21 hours, the polymer-coated pigment particles were recovered by centrifugation at 6000 rpm for 10 minutes. The solids produced were redispersed in toluene and centrifuged. This cycle was repeated twice and the solids were dried at 50° C. under vacuum to produce the final product.

Example 2

Step A: Deposition of 3-Aminopropyltrimethoxysilane on White Pigment Particles

To a 250 mL flask, $TiO_2$ (Dupont R960, 10 g), tetrahydofuran (100 mL) and 0.5 mL of DI water were added and sonicated for 30 minutes, followed by the addition of 3-aminopropyltrimethoxysilane (1 g). The flask was purged with nitrogen for 20 minutes and then heated to 65° C. with magnetic stirring. After 15 hours, the solids were recovered by centrifugation at 6000 rpm for 10 minutes. The solids produced were redispersed in THF and centrifuged. This cycle was repeated twice and the solids were dried at room temperature under vacuum to produce the desired product.

Step B: Deposition of 4,4'-Azobis(4-Cyanovaleric Acid) on White Pigment Particles To a 250 mL flask, the particles (10 g) prepared in Step A and 100 mL of THF were added and sonicated for 30 minutes, followed by the addition of 4'-azobis(4-cyanovaleric acid) (2.35 g), N,N'-dicyclohexylcarbodiimide (DCC) (1.73 g), and 4-dimethylaminopyridine (DMAP) (0.25 g). The reactor was conducted at 0° C. with magnetic stirring. After 29 hours, the mixture was centrifuged at 6000 rpm for 10 minutes. The solids were washed with THF once and methanol twice, and dried at room temperature under vacuum overnight to produce the desired product.

Step C: Preparation of Polymer Coated White Pigment Particles

To a 100 mL flask, the particles (2 g) prepared in Step B and 20 mL of THF were added and sonicated for 5 minutes, followed by the addition of lauryl methacrylate (20 g) and 2-(dodecylthiocarbonothioylthio)-2-methylpropionic acid (0.2 g). The flask was purged with nitrogen for 20 minutes and then heated to 65° C. After 19 hours, the polymer coated pigment particles were recovered by centrifugation at 6000 rpm for 10 minutes. The solids produced were redispersed in THF and centrifuged. This cycle was repeated twice and the solids were dried at 50° C. under vacuum to produce the final product.

Example 3

Step A: Deposition of Methacryloxypropyltrimethoxysilane on White Pigment Particles To a 250 mL reactor, $TiO_2$ (Dupont R960, 10 g), isopropanol (80 g), DI water (3 g), and Z-6030 (Dow Corning, 4 g, 40% in methanol) were added. The reactor was heated to 65° C. with mechanical stirring in a sonication bath. After 3 hours, the mixture was centrifuged at 6000 rpm for 10 minutes. The solids were redispersed in isopropanol (100 g), centrifuged and dried at 50° C. under vacuum overnight to produce 9 g of the desired product.

Step B: Preparation of Polymer Coated White Pigment Particles

To a 250 mL flask, the particles (5 g) prepared from Step A and 25 g of toluene were added and sonicated for 30 minutes, followed by the addition of 2-ethylhexyl acrylate (15 g), 2-(dodecylthiocarbonothioylthio)-2-methylpropionic acid (50 mg) and AIBN (50 mg). The flask was purged with nitrogen for 20 minutes and then heated to 80° C. After 16 hours, the polymer coated pigment particles were recovered by centrifugation at 6000 rpm for 10 minutes. The solids produced were redispersed in toluene and centrifuged. This cycle was repeated twice and the solids were dried at 50° C. under vacuum to produce 4.8 g of the final product.

Example 4

Step A: Deposition of Vinylbenzylaminoethylaminopropyl-trimethoxysilane on Black Pigment Particles To a 1 L reactor, Black 444 (Shepherd, 40 g), isopropanol (320 g), DI water (12 g), ammonium hydroxide (28%, 0.4 g) and Z-6032 (Dow Corning, 16 g, 40% in methanol) were added. The reactor was heated to 65° C. with mechanical stirring in a sonication bath. After 5 hours, the mixture was centrifuged at 6000 rpm for 10 minutes. The solids were redispersed in isopropanol (300 g), centrifuged and dried at 50° C. under vacuum overnight to produce 38 g of the desired product.

Step B: Preparation of Inner Layer Polymer on Pigment Particles

To a 250 mL flask, the particles (5 g) prepared from Step A and 50 g of toluene were added and sonicated for 30 minutes, followed by the addition of styrene (20 g), 2-(dodecylthiocarbonothioylthio)-2-methylpropionic acid (50 mg) and AIBN (10 mg). The flask was purged with nitrogen for 20 minutes and then heated to 80° C. After 19 hours, the polymer coated pigment particles were recovered by centrifugation at 6000 rpm for 10 minutes. The solids produced were redispersed in toluene and centrifuged. This cycle was repeated twice and the solids were dried at 50° C. under vacuum to produce 4.8 g of the final product.

Step C: Preparation of Outer Layer Polymer on Pigment Particles

To a 250 mL flask, the particles (4.5 g) prepared from Step B above and 50 g of toluene were added and sonicated for 30 minutes, followed by the addition of lauryl acrylate (20 g), 2-dodecylthiocarbonothioylthio)-2-methylpropionic acid (50 mg) and AIBN (10 mg). The flask was purged with nitrogen for 20 minutes and then heated to 80° C. After 19 hours, the polymer coated pigment particles were recovered by centrifugation at 6000 rpm for 10 minutes. The solids produced were redispersed in toluene and centrifuged. This cycle was repeated twice and the solids were dried at 50° C. under vacuum to produce 4 g of the final product.

Example 5

Electro-Optic Properties of Dispersion

A dispersion was prepared by dispersing the white pigment particles prepared in Example 3 and the black pigment particles prepared in Example 4 in isopar-G with a charge control agent. The dispersion was then injected into an ITO cell made of two ITO glasses with ~50 µm gap. The two ITO glasses were connected to a DC voltage source with one as the negative ("−") electrode and the other one as the positive ("+") electrode.

An electric field was formed perpendicular to the ITO glasses inside the cell. Any charged species would move toward an electrode having a charge polarity opposite of the charge polarity carried by the charged species, under the electric field (electrophoresis).

In this experiment, the white pigment particles with the positive charge moved to be collected on the "−" electrode while the negatively charged black pigment particles moved to be collected on the "+" electrode. With the increase of voltage or electric field strength, the white pigment particles were more densely packed on the "−" electrode as shown by increasing whiteness.

With an applied voltage of 35V, reflectance was measured on both sides of the ITO glasses by using a spectrophotometer. The obtained contrast, defined as the ratio between reflectance in the white state and dark state, was 21.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. A method of preparing coated charged pigment particles dispersed in a hydrocarbon solvent, comprising polymer chains attached to the pigment particle surface, comprising:
   (a) reacting pigment particles with a Reversible Addition-Fragmentation chain Transfer (RAFT) reagent bearing an anchoring group; and
   (b) performing RAFT polymerization in the presence of a free radical initiator, thereby causing the pigment particles to attach to polymer chains comprising:
      an outer polymer layer formed from first monomers, the outer polymer layer being compatible with the hydrocarbon solvent,
      an inner polymer layer formed from second monomers different from the first monomers, wherein the second monomers comprise a charged functional group to provide charge to the pigment particles, and
      a terminal thiocarbonylthio group attached to the outer polymer layer.

2. The method of claim 1, wherein the terminal thiocarbonylthio group comprises an optionally substituted alkyl, an optionally substituted aryl, an optionally substituted alkylaryl, or an optionally substituted arylalkyl group.

3. The method of claim 1, wherein the first monomer is selected from the group consisting of styrene, methyl acrylate, methyl methacrylate, n-butyl acrylate, n-butyl methacrylate, t-butyl acrylate, t-butyl methacrylate, vinyl pyridine, n-vinyl pyrrolidone, 2-hydoxyethyl acrylate, 2-hydroxyethyl methacrylate, dimethylaminoethyl methacrylate, vinylbenzylaminoethylaminopropyl-trimethoxysilane, methacryloxypropyltrimethoxysilane, acrylic acid, methacrylic acid and vinyl phosphoric acid, and
   the second monomer is selected from the group consisting of lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, and n-octadecyl methacrylate.

4. The method of claim 1, further comprising mixing the pigment particles with a reagent comprising both the free radical initiator and the anchoring group.

5. The method of claim 1, wherein steps (a) and (b) are initiated with different free radical initiators.

6. The method of claim 1, further comprising modifying the surface of the pigment particles to introduce a vinyl functional group.

7. The method of claim 1, wherein the resulting particle comprises a molar ratio of first monomers to second monomers of between 10:1 and 1:1.

8. The method of claim 1, wherein the anchoring group is a carboxylic acid group, a primary amino group, a secondary amino group, a hydroxyl group, a mecapto group, or a silane group.

* * * * *